(12) United States Patent
Recchia et al.

(10) Patent No.: US 12,276,558 B2
(45) Date of Patent: Apr. 15, 2025

(54) METHOD AND APPARATUS FOR CALIBRATING A TORQUE SENSOR USING THE SEPARATION OF CALIBRATED AND EXPECTED TORQUE VALUES

(71) Applicant: GE Avio S.r.l., Rivalta di Torino (IT)

(72) Inventors: Simone Recchia, Bari (IT); Diego di Leo, Trani (IT); Pierpaolo Forte, Wichita, KS (US); Cristian Lai, Bari (IT)

(73) Assignee: GE Avio S.r.l., Rivalta di Torino (IT)

( * ) Notice: Subject to any disclaimer, the term of this patent is extended or adjusted under 35 U.S.C. 154(b) by 162 days.

(21) Appl. No.: 17/888,856

(22) Filed: Aug. 16, 2022

(65) Prior Publication Data

US 2023/0314254 A1 Oct. 5, 2023

(30) Foreign Application Priority Data

Apr. 1, 2022 (IT) .................. 102022000006545

(51) Int. Cl.
  *G01L 25/00* (2006.01)
  *F02C 9/00* (2006.01)
  *G01L 5/00* (2006.01)

(52) U.S. Cl.
  CPC ............ *G01L 25/003* (2013.01); *F02C 9/00* (2013.01); *G01L 5/00* (2013.01)

(58) Field of Classification Search
  CPC .............. G01L 25/00; G01L 3/26; G01L 3/24
  See application file for complete search history.

(56) References Cited

U.S. PATENT DOCUMENTS

| | | | |
|---|---|---|---|
| 5,165,240 A | 11/1992 | Page | |
| 7,111,611 B1* | 9/2006 | Lyon | B60W 10/06 123/436 |
| 8,352,149 B2* | 1/2013 | Meacham | F01D 21/14 702/33 |
| 8,417,411 B2* | 4/2013 | Dlugoss | F16H 61/12 701/87 |

(Continued)

FOREIGN PATENT DOCUMENTS

| | | |
|---|---|---|
| CN | 106704009 | 5/2017 |
| DE | 202006007689 | 9/2007 |

(Continued)

OTHER PUBLICATIONS

French Application No. FR2109526, Filed Sep. 10, 2021, Title: Flexibilities in a geared gas turbine engine, (Ref. B-024242).

(Continued)

*Primary Examiner* — Tran M. Tran
(74) *Attorney, Agent, or Firm* — Fitch, Even, Tabin & Flannery LLP

(57) ABSTRACT

Input is received. A conformance is determined. When conformance is determined, a raw torque is measured from a torque sensor at an engine; the raw torque is calibrated using the torque sensor parameters to produce a calibrated torque value, non-torque parameters associated with the engine are measured and the non-torque parameters are applied to a lookup structure to obtain an expected torque value. A separation of the calibrated torque value and the expected torque value is determined and based upon the separation, an operation of the torque sensor is controlled.

18 Claims, 7 Drawing Sheets

(56) References Cited

U.S. PATENT DOCUMENTS

| | | | | |
|---|---|---|---|---|
| 8,565,998 | B2* | 10/2013 | Brown | F02C 9/00 |
| | | | | 701/99 |
| 8,738,329 | B2* | 5/2014 | Cho | G01L 25/003 |
| | | | | 702/183 |
| 8,903,570 | B2 | 12/2014 | Bailly | |
| 9,217,682 | B2* | 12/2015 | Brummel | F16C 3/02 |
| 9,500,138 | B1 | 11/2016 | Chaohong | |
| 10,059,460 | B2 | 8/2018 | Dauriac | |
| 10,213,266 | B2* | 2/2019 | Zemlok | A61B 34/71 |
| 10,450,863 | B2* | 10/2019 | Jacobs | F01D 5/02 |
| 10,677,670 | B2* | 6/2020 | Renault | G01L 3/101 |
| 10,871,409 | B2 | 12/2020 | Sipila | |
| 10,975,717 | B2* | 4/2021 | Moniz | F01D 17/04 |
| 11,493,407 | B2* | 11/2022 | Gravina | B64D 43/00 |
| 11,536,202 | B2* | 12/2022 | Caimano | F02C 7/275 |
| 11,746,708 | B2* | 9/2023 | Lamberti | H04W 12/06 |
| | | | | 717/172 |
| 2016/0178464 | A1* | 6/2016 | Burns | F02C 3/10 |
| | | | | 73/112.01 |
| 2017/0167287 | A1 | 6/2017 | Jacobs | |

FOREIGN PATENT DOCUMENTS

| | | |
|---|---|---|
| EP | 2653387 | 10/2013 |
| FR | 3130313 | 6/2023 |
| FR | 3130323 | 6/2023 |
| FR | 3130875 | 6/2023 |
| KR | 101298846 | 8/2013 |
| WO | 2021181027 | 9/2021 |

OTHER PUBLICATIONS

French Application No. FR2109530, Filed Sep. 10, 2021, Title: Flexibilities in a geared gas turbine engine, (Ref. B-024243).

French Application No. FR2109787, Filed Sep. 17, 2021, Title: Aircraft Turbine Engine With an Off-Axis Propeller, (Ref. B-024794).

French Application No. FR2112509, Filed Nov. 25, 2021, Title: Device for Pressurizing a Turbomachine Enclosure With a Curvic Coupling Passage, and Corresponding Turbomachine, (Ref. B-0250350).

French Application No. FR2112280, Filed Nov. 19, 2021, Title: Assembly With Variable Setting for a Fan of a Turbomachine, (Ref. B-024468).

French Application No. FR2202172, Filed Mar. 11, 2022, Title: Aeronautical Thruster, (Ref. B-025596).

French Application No. FR2202171, Filed Mar. 11, 2022, Title: Propulsion System for an Aircraft, (Ref. B-025595).

French Application No. FR2201260, Filed Feb. 14, 2022, Title: Propulsion unit for aircraft comprising a gas turbine engine and an electrical machine mounted in an enclosure with a cooling system comprising a main coupling member, method for using such a unit, (Ref. B-025173).

French Application No. FR2201266, Filed Feb. 14, 2022, Title: Gas turbine engine assembly comprising a housing with half-shells bearing variable pitch inlet stator vanes, (Ref. B-024190).

French Application No. FR2200883, Filed Feb. 1, 2022, Title: Method for managing the torque of a turbomachine, (Ref. B-025105).

French Application No. FR2114236, Filed Dec. 22, 2021, Title: Turbine Engine Subassembly Including a Gooseneck With an Improved Configuration and Turbine Engine Including a Subassembly of This Type (Ref. B-024601).

French Application No. FR2114272, Filed Dec. 22, 2021, Title: Aircraft Turbine Engine Comprising Blade Pitch Control Using Local Pressure Measurements, (Ref. B-024494).

French Application No. FR2113949, Filed Dec. 20, 2021, Title: Turbomachine Module Equipped With a Pitch Change System and a Fluid Transfer Device, (Ref. B-024662).

French Application No. FR2113966, Filed Dec. 20, 2021, Title: Fluid Transfer Device With Hydraulic and Mechanical Connection Means, (Ref. B-024661).

French Application No. FR2113953, Filed Dec. 20, 2021, Title: Turbomachine Module Equipped With a Pitch Change System and a Fluid Transfer Device With Blind Sleeving, (Ref. B-024657).

French Application No. FR2113952, Filed Dec. 20, 2021, Title: Turbomachine Module Equipped With Variable Pitch Vanes and Oil Transfer Device, (Ref. B-023793).

French Application No. FR2113951, Filed Dec. 20, 2021, Title: Turbomachine Module Equipped With Variable Pitch Vanes and an Annular Interface Shroud, (Ref. B-023792).

French Application No. FR2113845, Filed Dec. 17, 2021, Title: Aircraft Turbomachine, (Ref. B-025396).

French Application No. FR2113847, Filed Dec. 17, 2021, Title: Aircraft Turbomachine, (Ref. B-025189).

French Application No. FR2113552, Filed Dec. 15, 2021, Title: Method for managing the torque of a turbomachine, (Ref. B-025059).

French Application No. FR2113361, Filed Dec. 13, 2021, Title: Turbomachine for an Aircraft Comprising an Electric Machine, (Ref. B-025039).

French Application No. FR2113100, Filed Dec. 7, 2021, Title: Cooling-air distribution case, (Ref. B-024474).

French Application No. FR2112869, Filed Dec. 2, 2021, Title: Turbine engine comprising an electric machine downstream from a turbine shaft and driven by this shaft, (Ref. B-025037).

French Application No. FR2112705, Filed Nov. 30, 2021, Title: Turbomachine Comprising a Lubrication Enclosure and a Speed Reducer, (Ref. B-024542).

French Application No. FR2112486, Filed Nov. 25, 2021, Title: Electric Energy Conversion and Transport System for the Internal Hybridization of an Aircraft Turbo-Engine, (Ref. B-025286).

French Application No. FR2112278, Filed Nov. 19, 2021, Title: Module for Assembling a Fan Blade of a Turbomachine, (Ref. B-024469).

\* cited by examiner

METHOD AND APPARATUS FOR CALIBRATING A TORQUE SENSOR USING THE SEPARATION OF CALIBRATED AND EXPECTED TORQUE VALUES

RELATED APPLICATIONS

This application claims priority from Italian Patent Application Number IT 102022000006545 filed Apr. 1, 2022, which is hereby incorporated herein by reference in its entirety.

TECHNICAL FIELD

These teachings relate generally to aircraft engines and more particularly to calibrating sensors in aircraft engines.

BACKGROUND

Engine torque sensors measure the torque present in an aircraft engine. The measured torque can be used by one of the computers of an aircraft (e.g., a full authority digital engine control (FADEC) controller) to control various operations of the engine and/or aircraft. The torque sensors sometimes need to be calibrated and in other cases these sensors become degraded and the values measured cannot be trusted.

BRIEF DESCRIPTION OF THE DRAWINGS

Various needs are at least partially met through provision of the method and apparatus for calibrating the torque sensor of an aircraft engine described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
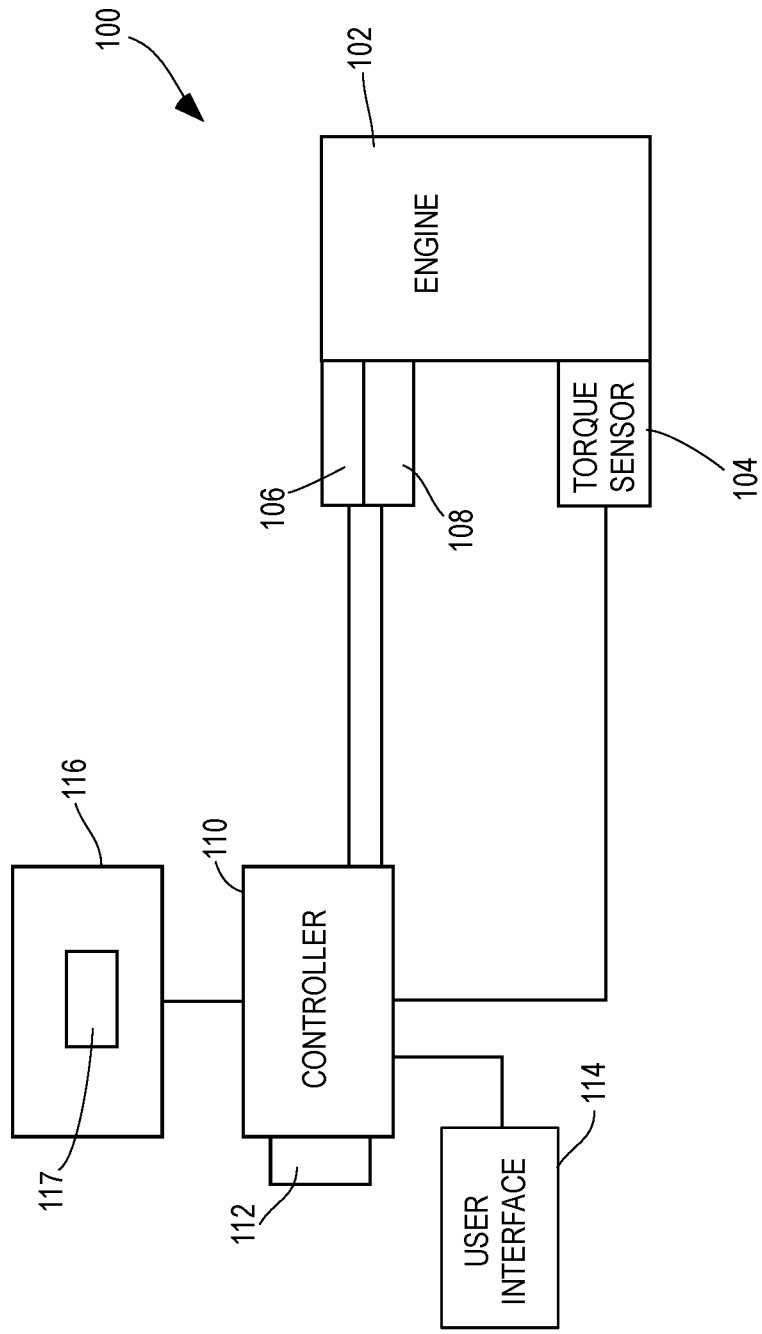
FIG. 1 comprises a diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The torque calibration approaches described herein automatically check the consistency of parameters and validate the health of torque sensors of an aircraft engine and these steps are made in compliance with various standards (e.g., cyber-security or other security guidelines). Advantageously, invalid parameters associated with the sensor are discarded if not consistent with the associated engine and human errors and intentional acts of sabotage are prevented. Although the approaches provided herein are shown as being applied to aircraft engines, it will be appreciated that these approaches are applicable to other engine types and other applications.

In other aspects, the approaches provided herein allow the loading of torque calibration coefficients into a full authority digital control engine (FADEC) controller used in aircraft through an aircraft flight system by means of an operator-assisted procedure when the engine is deactivated (e.g., the engine is off, on the ground, and/or in maintenance mode). These approaches may be implemented as a software prognostic validation strategy risk management to prevent or detect incorrect entry of parameters or FADEC controller swapping in the field thereby allowing the procedures to be certifiable and avoid cyber security issues.

Advantageously, the approaches provided herein are inexpensive to implement since they require no additional sensors, wires and/or other hardware and, consequently, add no additional weight for custom computer hardware. These approaches also provide better performance than previous approaches since they need no analog or discrete conversions.

In other aspects, the approaches provided herein introduce a dedicated software validation strategy capable of avowing unintentional or intentional human error and a prognostic strategy in detecting severe hardware sensor degradation, in which case the FADEC controller automatically excludes the loaded coefficient from its control rules resulting in operation of the FADEC controller in a reversionary mode. These approaches are additionally more accurate than previous calibration approaches, are more expandable, and provide improved fault and part-to-engine mismatch detection.

In many of these embodiments, input is received and includes an engine identifier from an engine and torque sensor parameters associated with a torque sensor of the engine. A conformance of the engine identifier and torque sensor parameters to an expected engine identifier and expected torque sensor parameters for the engine is determined.

When conformance is determined, the engine is activated; a raw torque is measured from the torque sensor (or potentially a different torque sensor) at the engine; the raw torque is calibrated using the torque sensor parameters to produce a calibrated torque value, non-torque parameters associated with the engine are measured and the non-torque parameters are applied to a lookup structure to obtain an expected torque value; a separation or closeness of the calibrated torque value and the expected torque value is determined; and based upon the separation or closeness, an operation of the torque sensor is controlled.

In aspects, the engine identifier comprises a serial number. In other aspects, the torque sensor parameters comprise a gain factor and an offset. In other examples, the non-torque parameters comprise speed or pressure. Other examples of engine identifiers, torque sensor parameters, and non-torque parameters are possible.

In examples, the conformance is determined by examining whether the parameters are within predetermined ranges. In other examples, the calibrating of the raw torque is performed by applying the torque sensor parameters to the raw torque.

In still other aspects, the lookup structure is a lookup table. Other examples of data structures are possible. In still other aspects, the input is displayed or presented on a plate attached to the engine. Other examples of presentation structures are possible.

In examples, controlling an operation of the torque sensor comprises deactivating the torque sensor. In other examples, the separation or closeness is determined by comparing the difference between the calibrated torque value and the expected torque value to a threshold.

In others of these embodiments, a system includes an engine, a torque sensor coupled to the engine, at least one non-torque sensor and a controller. The controller is coupled to the torque sensor and the at least one non-torque sensor.

The controller is configured to, when the engine is deactivated: receive input including an engine identifier associated with the engine and torque sensor parameters associated with a torque sensor of the engine; determine a conformance of the engine identifier and torque sensor parameters to an expected engine identifier and expected torque sensor parameters for the engine.

When conformance is determined and upon activation of the engine, the controller is further configured to: measure a raw torque via the torque sensor at the engine; calibrate the raw torque using the torque sensor parameters to produce a calibrated torque value; measure non-torque parameters associated with the engine; apply the non-torque parameters to a lookup structure to obtain an expected torque value; determine a separation or closeness of the calibrated torque value and the expected torque value; and, based upon the separation or closeness, control an operation of the torque sensor.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description.

Referring now to FIG. 1, one example of a system 100 for calibrating the torque sensor of an aircraft engine is described. The system includes an engine 102, a torque sensor 104 (coupled to the engine 102 or parts of the engine 102 such as shafts of the engine), a first non-torque sensor 106, a second non-torque sensor 108, and a controller 110. A plate 112 is coupled to or associated with the engine 102.

The engine 102 is, in aspects, a jet aircraft engine. The engine 102 includes a compressor section, a combustion section, and a turbine section. Various shafts turn components of the engine and the torque sensor 104 may measure the torque on these shafts or the torques associated with other engine components or structures.

The measured torques can be used by the controller 110 to control various operations of the engine 102 including, but not limited to, the operating speed of the engine, the operational states of the engine 102, the timing of operations of the engine 102, and/or the activation and/or deactivation of different components or sections of the engine 102. Other examples are possible.

As mentioned, the torque sensor 104 is configured to measure the torque in parts of or associated with the engine 102. Although one torque sensor 104 is shown, it will be appreciated that other torque sensors could also be deployed. For example, a torque sensor 104 may be deployed on each shaft of the engine 102. The approaches described herein can be applied to each of multiple torque sensors.

The first non-torque sensor 106 and the second non-torque sensor 108 measure non-torque parameters of the engine 102. For example, the first non-torque sensor 106 may measure the speed of the engine 102 and the second non-torque sensor 108 may measure the pressure of the engine 102 or parts of the engine 102. Other examples of non-torque sensors are possible.

The plate 112 includes the engine serial number (ESN), a gain factor, an offset, and a checksum. Other parameters are possible. In aspects, the plate 112 has these values and/or information printed on its face.

The engine serial number uniquely identifies the engine 102. The offset and the gain factors represent the correction to be applied to the torque sensor 104 installed on the engine 102 in achieving desired accuracy/performance. In aspects, TORQUE (calibrated)=TORQUE (raw)*GAIN+OFFSET). The checksum is the ESN+GAIN+OFFSET. TORQUE (calibrated) is the calibrated torque. TORQUE (raw) is the torque measured from the engine. GAIN is the gain factor. OFFSET is the offset and ESN is the engine serial number.

In aspects, the offset and the gain factors are determined during an acceptance test at an acceptance facility, by comparing the measured raw torque (from the torque sensor 104) with a measured torque from a facility torque sensor (e.g., an extremely highly accurate sensor that provides measurements that can be used as a benchmark, and not shown) and finding the gain and offset that when applied to the raw torque, minimizes the error between the torque sensor 104 and the facility torque sensor.

A user interface 114 couples to the controller 110. The user interface 114 is configured to receive user input involving parameters on the plate 112. The user interface 114 may include a screen, touch screen, keyboard, mouse, or any other element or combination of elements that allow an operator or user to enter parameters into the controller 110.

Other examples of components, structures, or configurations of the user interface 114 are possible.

The controller 110 may be a FADEC controller or may be a different type of controller. The controller 110 is coupled to a memory 116. It will be appreciated that as used herein the term "controller" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The controller 110 may be configured (for example, by using corresponding programming stored in a memory as will be well understood by those skilled in the art) to carry out one or more of the steps, actions, and/or functions described herein.

The memory 116 includes computer instructions that implement any of the functions described herein. The memory 116 also includes a lookup structure 117 as described elsewhere herein. In examples, the memory 116 is a non-volatile memory. Other types of electronic memories may also be used.

The controller 110 is configured to, when the engine 102 is deactivated, receive operator input (via the user interface 114) including an engine identifier associated with the engine and torque sensor parameters associated with a torque sensor of the engine. The controller 110 is further configured to determine a conformance of the engine identifier and torque sensor parameters to an expected engine identifier and expected torque sensor parameters for the engine 102. In aspects, the conformance is determined examines to see if the engine identifier and torque sensor parameters are within predetermined ranges.

When conformance is determined and upon activation of the engine 102, the controller 110 is further configured to measure a raw torque from the torque sensor 104 at the engine 102. The controller 110 is configured to calibrate the raw torque using the torque sensor parameters to produce a calibrated torque value. The raw torque is calibrated by applying the torque sensor parameters to the raw torque.

The controller 110 is further configured to measure non-torque parameters associated with the engine 102 using/received from the first non-torque sensor 106 and the second non-torque sensor 108 and apply the non-torque parameters to a lookup structure 117 to obtain an expected torque value. In aspects, the lookup structure 117 is a lookup table data structure. Other types of data structures may also be used.

The controller 110 is configured to determine a separation or closeness of the calibrated torque value and the expected torque value. In aspects, the separation or closeness is determined by comparing the difference between the calibrated torque value and the expected torque value to a threshold.

The controller 110 is configured to, based upon the separation or closeness, control an operation of the torque sensor 104. In aspects, the operation of the torque sensor 104 is controlled by deactivating the torque sensor 104. In other examples, the torque sensor 104 may still be activated but any measurements made by the torque sensor 104 are ignored by the controller 110.

Data can be obtained from other sources for various purposes. In some aspects, data could be pulled from a data lake by serial number, radio frequency identifier (RFID) tag, or according to other parameters. For example, when the pilot has inputs (e.g., a serial number, gain, offset, or checksum) that fall into a valid range but are off by a small amount, stored data by a ground station is accessed to validate.

In one example of the operation of the system of FIG. 1, the plate 112 is attached to the engine 102 at the time of manufacturing and includes an engine serial number (e.g., 1), a gain factor (e.g., 10), an offset (e.g., 10), and a cyclic redundancy check (CRC) (e.g., serial number+gain factor+offset=21).

An operator enters in this plate information into the user interface 114 and these are received by the controller 110. The controller 110 (1) checks that the information from the plate has been entered correctly and, (2) checks that the plate is the correct plate for the engine 102.

At this point, the engine 102 is deactivated. The controller 110 checks as to whether the gain factor, offset, and engine serial number are within predetermined ranges and/or acceptable values. For example, the gain factor may be examined to see whether it is within a first predetermined range of values (e.g., is it within 1-20). In another example, the offset may be checked to see if these are within a second predetermined range of values (e.g., within 5-30). In another example, the engine serial number is checked to see if it is an acceptable value (e.g., it is an integer) or within acceptable ranges of values (e.g., within 1-15). Then, a check is made as to whether the checksum accurate (e.g., the gain, offset, and engine serial number entered are summed and compared to the expected checksum). In this example, the checksum operation confirms that the operator did not enter 42 instead of 21 (the correct expected summation of the values entered). The acceptable values may be previously entered into the controller 110 and stored in the memory 116. These values may also be obtained from other sources such as a data lake.

If all of these checks pass, the second part of the process is performed. The engine 102 is started or activated. The torque sensor 104 measures torque (the raw torque) of the engine 102. The raw torque is calibrated. More specifically, the raw torque is multiplied by the gain and the offset is added to this result. This result becomes the calibrated torque. In some aspects, a different torque sensor other than the torque sensor 104 can be used to measure the raw torque.

Other non-torque parameters (speed, pressure) are measured by the first non-torque sensor 106 and the second non-torque sensor 108 and applied to the lookup structure 117 to obtain the expected torque value. A check is made to see if it matches/how close (e.g., by comparing the difference in these two values to a threshold).

The result is used to disable use of the torque sensor 104 for engine calculations or other purposes. If disabled, the controller 110 may use the first non-torque sensor 106 and the second non-torque sensor 108 for calculations that control the engine 102. Disabling might include disabling a switch or electrical component of the sensor that disables the torque sensor 104 from being used.

Figure 2:
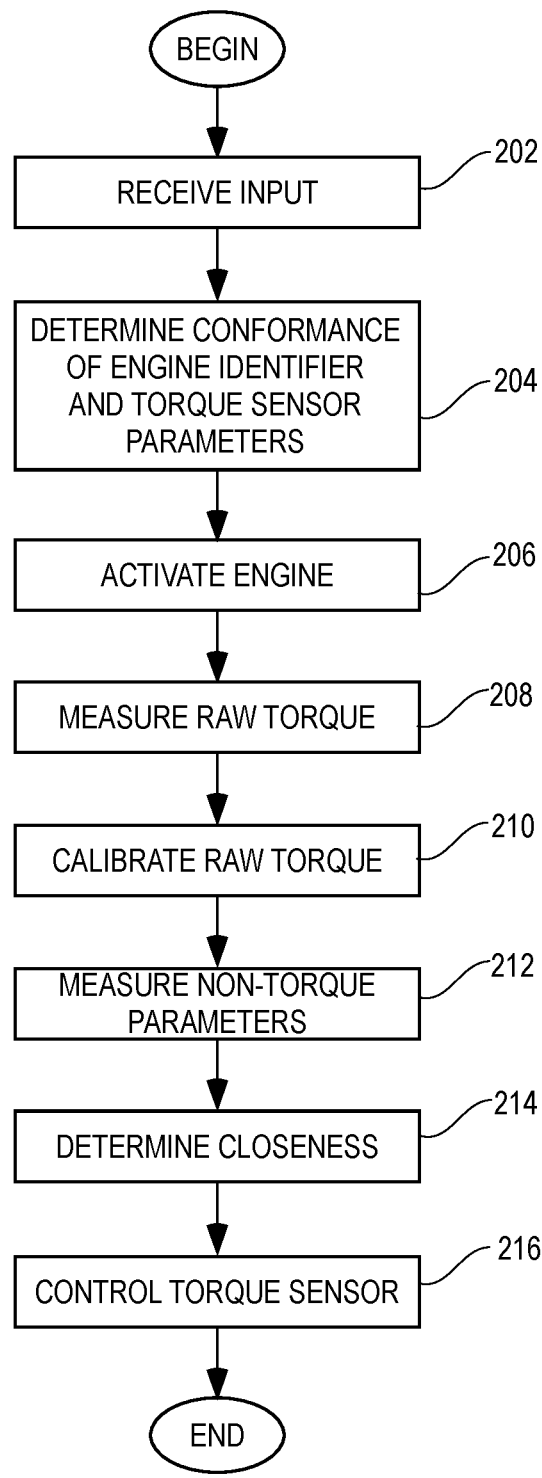
FIG. 2 comprises a flowchart as configured in accordance with various embodiments of these teachings.

Referring now to FIG. 2, one example of an approach for calibrating a torque sensor is described. At step 202, when the engine 102 is off, operator input is received. The operator input includes an engine identifier from the engine 102 and torque sensor parameters associated with a torque sensor 104 of the engine 102. The operator input may be received from a user interface such as a touchscreen or keyboard. The operator input may also be received as automated input from an automated process.

At step 204, with the engine 102 off, a conformance of the engine identifier and torque sensor parameters to an expected engine identifier and expected torque sensor parameters for the engine is determined. The conformance may be determined by comparing the user-inputted values to known acceptable ranges or other known acceptable values.

When conformance is determined, at step 206, the engine 102 is activated. For example, an operator may throw a switch to activate the engine 102. In other examples, the user interface is utilized to activate the engine (e.g., by entering commands, or alternatively, automatically). If no conformance is determined, then the engine 102 may be deactivated.

At step 208, a raw torque is measured by a torque sensor 104 at the engine 102. At step 210, the raw torque is calibrated by using the torque sensor parameters to produce a calibrated torque value. Calibrating the raw torque, in aspects, is performed by mathematically applying (e.g., adding or multiplying) the torque sensor parameters to the raw torque to create the calibrated torque value. For example, a controller (e.g., the controller 110) may perform these operations.

At step 212, non-torque parameters associated with the engine are measured, and the non-torque parameters are applied to a lookup structure to obtain an expected torque value. In examples, the non-torque parameters include speed and pressure. It will be appreciated that any number of non-torque parameters may be obtained and that other examples are possible.

At step 214, a separation or closeness of the calibrated torque value and the expected torque value is determined. In examples, separation or closeness may be determined by comparing the difference between the calibrated torque value and the expected torque value to a predetermined threshold. In examples, the separation or closeness may be defined as a percentage difference, e.g., a 5% difference. In other examples, separation or closeness may be defined as to whether the calibrated torque value is within an absolute threshold value of the expected torque (e.g., 10 units of torque).

At step 216 and based upon the separation or closeness, an operation of the torque sensor 104 is controlled. In examples, this operation physically deactivates the torque sensor 104, for example, by deactivating components (e.g., switches) in the sensor 104. In other examples, the torque sensor 104 remains active, and readings from the torque sensor 104 are ignored by the controller 110.

Figure 3:
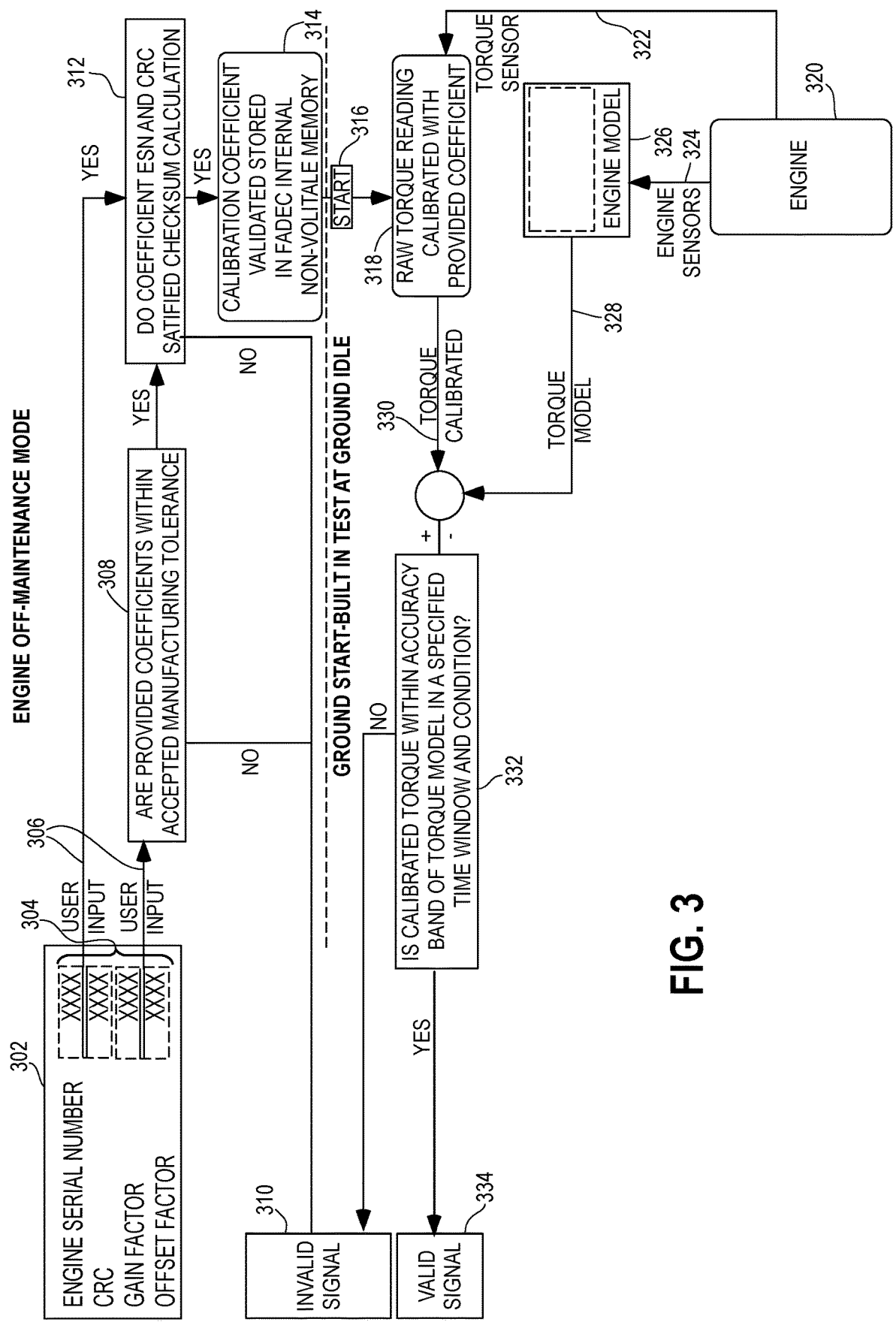
FIG. 3 comprises a diagram as configured in accordance with various embodiments of these teachings.

Referring now to FIG. 3, an example of calibrating torque sensors is described. These steps may be implemented by a controller (e.g., a FADEC controller) as described above.

A plate 302 with information 304 is provided. The information 304 includes the engine serial number, a checksum, an offset and a gain factor. The information 304 is entered as input at step 306. For example, an operator may utilize a user input (e.g., touchscreen or keyboard) to enter the information 304. Alternatively, automated scanning may be utilized to obtain the information 304.

At step 308, it is determined whether the information 304 (the engine serial number, checksum, offset and a gain factor) are within accepted manufacturing tolerances. For example, it is determined if the engine serial number, offset and gain factor are within acceptable tolerance or are otherwise acceptable values.

If the answer at step 308 is negative, an invalid signal is created by the controller 110 at step 310. The invalid signal may be used to control operation of the engine 120 or operation of the controller 110, which controls the operation of the engine 102. For example, the engine 102 may be deactivated.

If the answer is affirmative at step 308, at step 312, it is determined whether the entered checksum is valid. The checksum may represent a summation of the engine serial number, offset and gain factor and it may be determined whether the summation of the entered engine serial number, entered offset and entered gain factor equal the entered checksum. If the answer is negative, step 310 is executed.

If the answer is affirmative, then, at step 314, the offset and gain factor are validated and stored in a non-volatile internal memory of the controller 110. For example, validation may be accomplished by comparing the offset and gain factor to known valid ranges or values of offsets and gain factors. If the offset and gain factor are within these ranges, then the offset and gain factor are considered to be valid.

The engine is started at step 316. The engine may be manually activated, but, in other examples may be manually activated.

The engine 320 sends a raw torque reading 322, which is calibrated at step 318 to produce calibrated values 330. More specifically, the raw torque is multiplied by the gain and the offset is added to this result. This result becomes the calibrated torque.

The engine 320 sends non-torque readings 324, which are applied to a model (e.g., table) at step 326 to produce expected values 328. Application may be applying these values to a lookup table. For example, if the non-torque readings are a pressure of X and a speed of Y, the lookup table may specify that X and Y produces an expected torque value of Z.

At step 332, a determination is made as to whether the calibrated torque is within an accuracy band of the engine model for a specified time window and conditions. For example, the difference between the calibrated torque and the expected torque is determined, and the difference is compared to a threshold. If the difference exceeds the threshold, then the calibrated torque is not considered accurate, but, if the difference is equal to or less than the threshold, the calibrated torque is considered as being accurate. If the answer at step 332 is negative, step 310 is executed. If the answer at step 332 is affirmative, step 334 is executed, and a valid signal is produced. The valid signal may be used by the controller 100 to allow measurements of the torque sensor to be used to directly or indirectly (through other calculations) control engine and/or aircraft applications.

Figure 4:
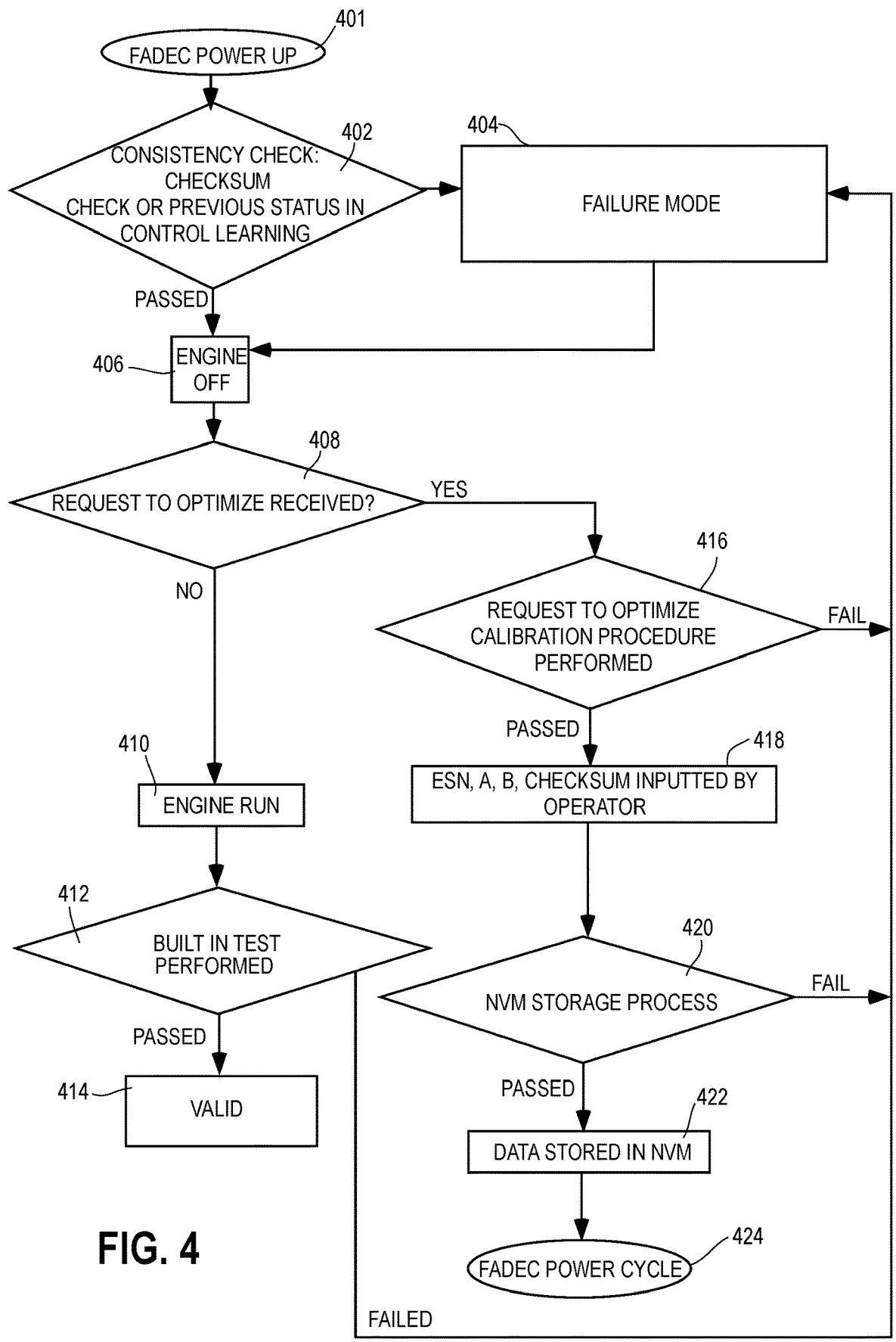
FIG. 4 comprises a flowchart as configured in accordance with various embodiments of these teachings.

Referring now to FIG. 4, another example of an approach for torque calibration is described. The approach used in FIG. 4 utilizes a controller (e.g., the controller 110, which may be a FADEC controller). At step 401, the controller (e.g., FADEC controller) is powered up. The non-toque calibration parameters include the engine serial number, gain factor, and offset. These may be stored in a non-volatile memory.

At step 402, a consistency check is made as described elsewhere herein. At every controller (e.g., FADEC controller), power up (both ground and flight) and non-volatile memory stored calibration parameters are checked to determine whether the parameters are consistent (e.g., within ranges) and a checksum of these parameters is correct.

If step 402 fails, then step 404 is executed. If step 402 is successful, then step 406 is executed as described below.

At step 404, a failure mode is entered. Fail parameters are stored in the non-volatile memory and a torque reversionary mode is entered excluding these from being used by the controller. After loading a new set of parameters, it is necessary to have a built-in test successfully completed to clear the failure condition.

At step 406, the engine 102 is shut off or deactivated. This may be accomplished by a switch being thrown or a command or instruction sent to the engine 102.

At step 408, it is determined whether a request to optimize the calibration procedures has been received. If the answer is negative, step 410 is executed, and, if the answer is affirmative, then step 416 is executed.

At step 410, the engine 102 is activated to run. A command may be entered, a button pushed, or a physical switch thrown to start the running of the engine 102, for example.

At step 412, a built-in test at ground idle is performed. The engine 102 sends a raw torque reading, which is calibrated to produce calibrated torque values. The engine 102 also sends non-torque readings, which are applied to a model (e.g., table) to produce expected values. A determination is made as to whether the calibrated torque is within an accuracy band of the engine model for specified time window and conditions. If the answer is negative, then step 404 is executed. If the answer is affirmative, then step 414 is executed and a valid signal produced. Values of the torque sensor can be used in calculations or control actions of the controller 110.

If the answer at step 408 is affirmative, then, at step 416, the request to optimize the calibration procedure is performed. In this step, the operator inputs the coefficient into aircraft computer that sends them to controller 110 (e.g., FADEC controller) using a communication bus. Then, the coefficients are checked and validated. In one example, a human operator performs the inputting of values, but automated processes could also be used.

At step 418, the engine serial number (ESN), gain, offset, and checksum as input by the operator are passed to the next step. As mentioned, a human operator performs the inputting of values, but automated processes could also be used.

At step 420, a non-volatile storage process is performed. This step makes the request to store the parameters (e.g., ESN, gain, offset, and checksum) to the non-volatile memory (e.g., the non-volatile memory of the FADEC controller), overwriting the old or current parameters stored in the memory. In aspects, this step allows parameters to be available and usable by the controller (e.g., FADEC controller) at the next activation (e.g., turning on) of the controller (e.g., FADEC controller). If this fails, then step 404 is performed. If parameters are stored successfully, then step 422 is executed.

At step 422, optimal data is stored in the non-volatile memory. For example, the optimal data may be stored in the memory 116 by the controller 110.

At step 424, FADEC controller power cycle operations are performed. At every power activation (e.g., on), the controller (e.g., the controller 110, which may be a FADEC controller) obtains and checks the parameters stored at that moment in non-volatile memory. For example, these checks may examine whether the parameters are within certain ranges.

Figure 5:
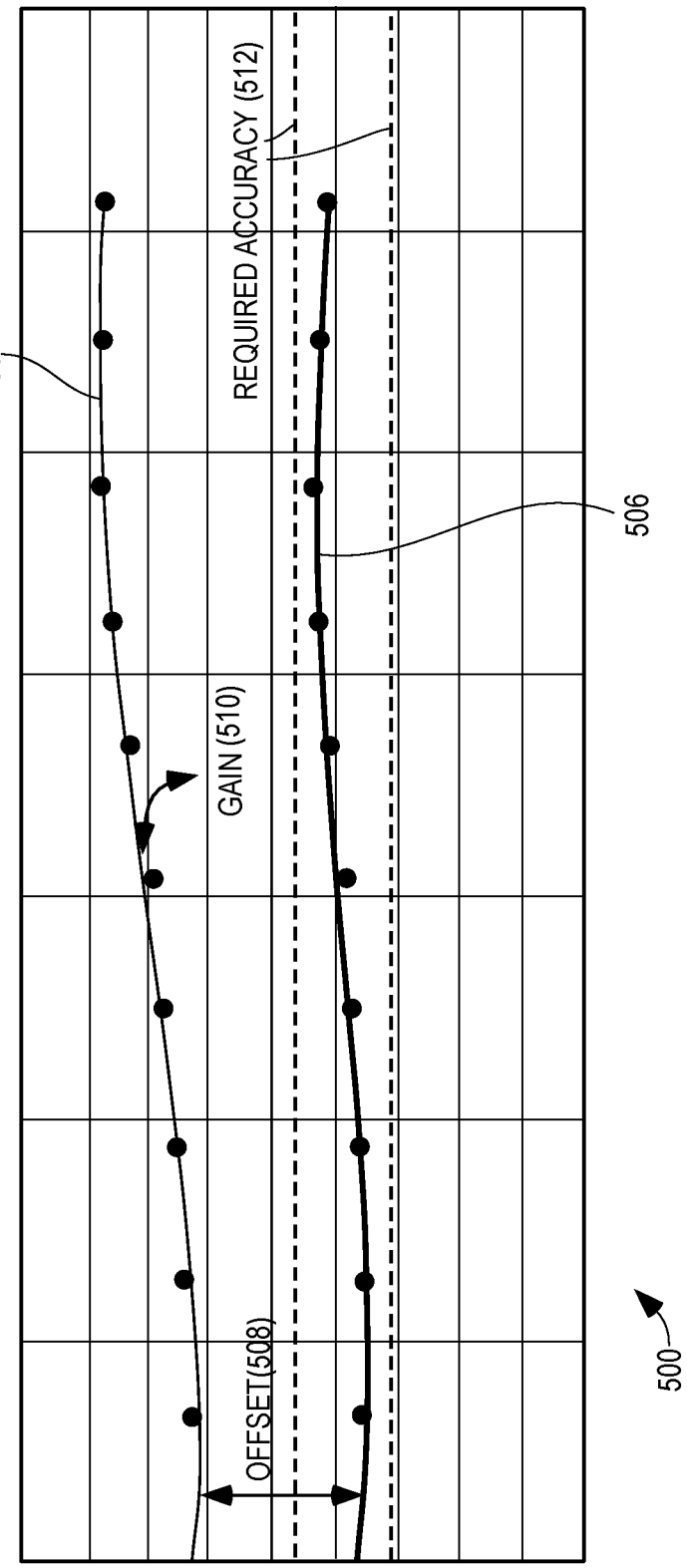
FIG. 5 comprises a diagram as configured in accordance with various embodiments of these teachings.

Referring now to FIG. 5, examples of how to obtain and apply the torque sensor parameters are described. In aspects, the gain and offset calibration factors are measured at the factory and written on the engine's mounted label visible for inspection during maintenance.

A graph 500 shows a calibrated plot 502 of calibrated torque values. The x-axis represents engine torque sensor values, and the y-axis represents differences between values measured by an actual engine torque sensor and a benchmark torque sensor (e.g., a highly accurate sensor deployed at a facility). As mentioned, the offset and the gain factors are determined during an acceptance test at a facility, by comparing the measured raw torque (from an engine torque sensor) with a measured torque from a facility torque sensor (e.g., an extremely highly accurate sensor that provides measurements that can be used as a benchmark) and finding the gain and offset that when applied to the raw torque, minimize or otherwise reduce the error between the engine torque sensor and the facility torque sensor. Extremely highly accurate sensors may have error rates of less than 1 percent and in some cases less than one tenth of one percent).

As shown in FIG. 5, raw torque values 504 (which are uncalibrated) are calibrated to form a calibrated set of values 506. It can be seen that an offset 508 has been applied to the raw torque values and is the difference between the calibrated and uncalibrated values as measured along the y-axis. A gain factor 510 is the angle of difference and has also been applied to the raw torque values 504. A required accuracy band 512 shows the desired accuracy to be obtained.

Figure 7:
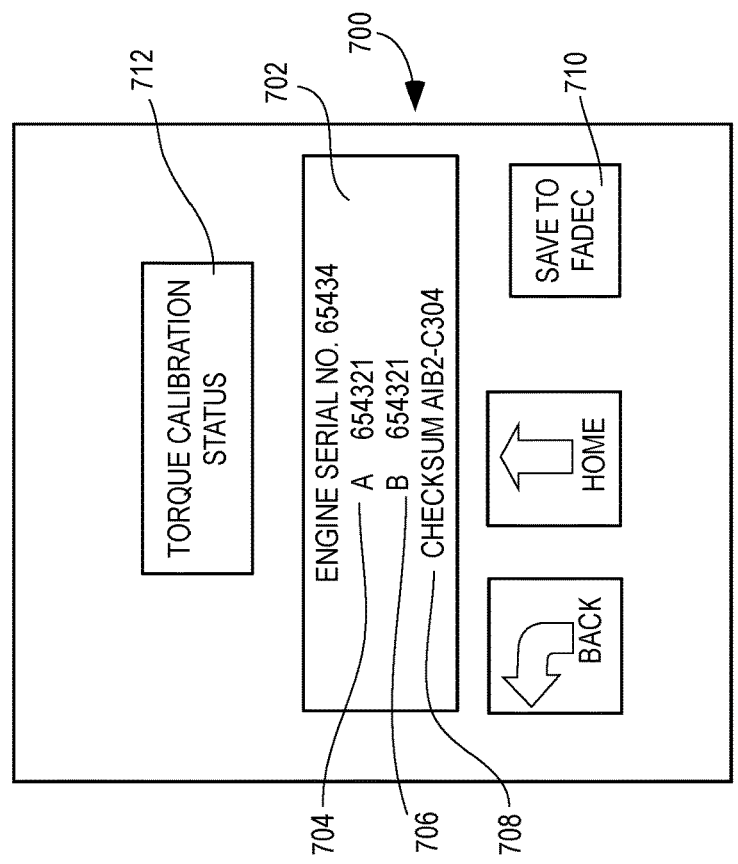
FIG. 7 comprises a diagram as configured in accordance with various embodiments of these teachings.
Figure 6:
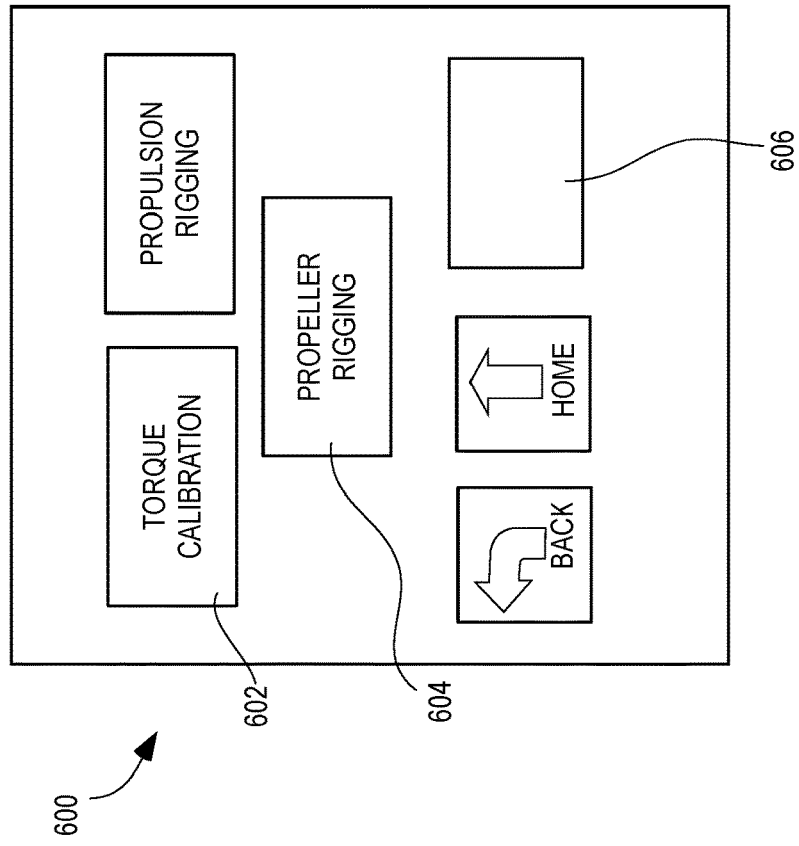
FIG. 6 comprises a diagram as configured in accordance with various embodiments of these teachings.
Figure 8:
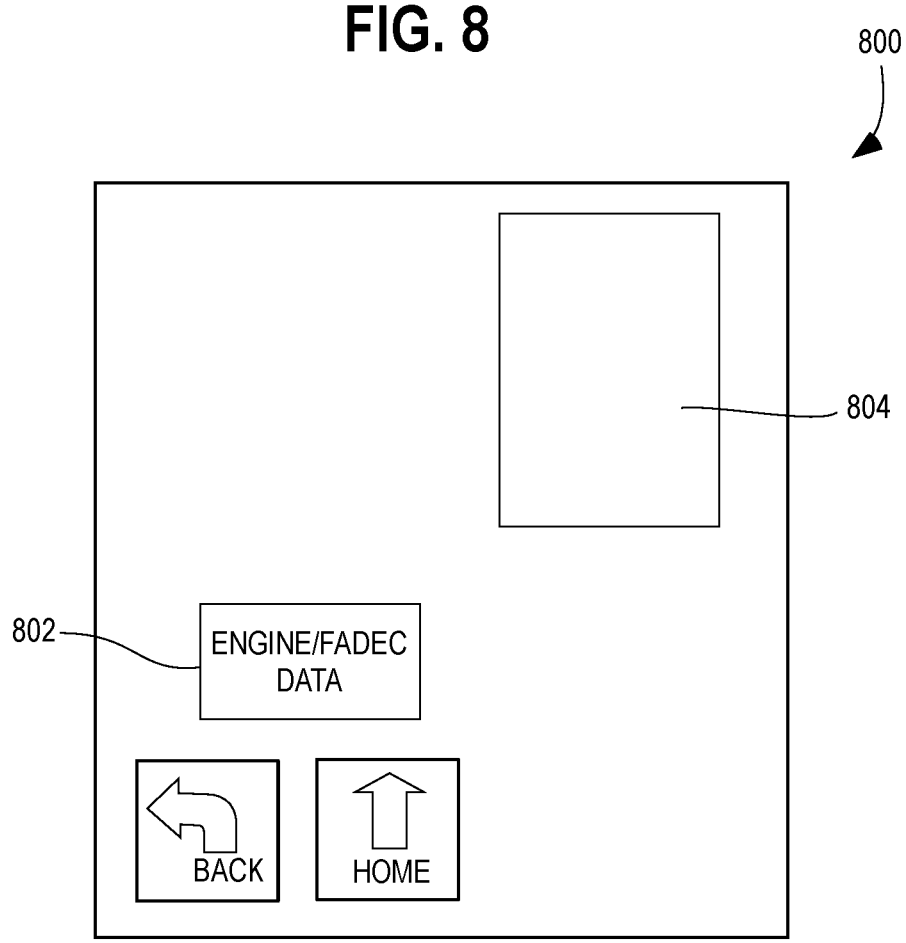
FIG. 8 comprises a diagram as configured in accordance with various embodiments of these teachings.

Referring now to FIGS. 6-8, screen shots of a user interface are described. The user interface may be a screen, computer, touch screen keyboard, computer mouse, or other mechanism used by an operator to enter information. The user interface may be coupled to the controller (e.g., a FADEC controller) or may be associated or incorporated with another computer or mobile device (e.g., smartphone, personal computer, or laptop to mention a few examples).

Referring now specifically to FIG. 6, screen 600 in a maintenance mode is described. In examples, this "Maintenance Mode" (or "Propulsion Rigging") screen 600 is reachable from cockpit computer (e.g., by pressing a propulsion rigging button 604), if all the following conditions are verified: the aircraft state is ground, a run/stop switch (not shown) is set to a stop position, and the engine core speed (Ng) is below 10%. Selection of a Torque Calibration button 602 will bring up the Torque Calibration page. Various maintenance mode information can be shown in a screen section 606.

Referring now to FIG. 7, a screen shot showing a torque calibration screen 700 is described. The torque calibration screen 700 contains the following four editable fields: an engine Serial Number field 702, a coefficient A field 704 (e.g., gain factor), a coefficient B field 706 (e.g., offset), and checksum field 708.

When the torque calibration screen 700 is open, all the fields are blank and must have information input by the operator according to the values read on the engine name plate. Once all the parameters have been inputted, upon pressing the button 710 (save to FADEC controller) the operator requests the storing of the inputted data into the controller's (e.g., FADEC controller's) non-volatile memory. Whenever the non-volatile storing process is successful, the torque calibration process is considered completed and the controller (e.g., FADEC controller) informs the operator by the status indication 712, which changes to "Pass."

Referring now to FIG. 8, a screen shot showing a screen 800 after completion of the torque calibration process is described.

After the completion of the torque calibration process, the operator validates the process by querying the controller (e.g., FADEC controller) to obtain the currently stored parameters (an operation that could be done in any time) and compare the currently stored parameters with the parameters inserted by the operator according to the engine nameplate. In other words, the operator again reads the parameters from the engine's nameplate, inserts them into the controller (e.g., the FADEC controller), and queries the controller (e.g., the FADEC controller) to verify if what was entered was correctly stored by the controller (e.g., the FADEC controller). Then, once the engine is activated, the controller (e.g., the FADEC controller) compares the expected torque with calibrated torque measured by the torque sensor(s) of the engine.

In this example, there is the "ENGINE/FADEC DATA" button 802 to query the controller (e.g., FADEC controller). Information from the controller (e.g., current parameters) be displayed at an area 804 of the screen 800. This action can be performed at any time.

In examples, the parameters are the engine serial number, offset, gain, and checksum. In examples, the engine serial number, gain and offset are in 6-digit form and the checksum is 8 alpha-numerical digits, without sign and decimal, to minimize the human error occurrence. As mentioned, both their integrity and consistency are verified from the controller (e.g., FADEC controller) before saving into non-volatile memory.

This approach protects against human factors like typographic errors, prevents wrong data injection into the system (intentionally or unintentionally), and allows a user to check controller (e.g., FADEC controller) values without special tooling or additional hardware.

Advantageously, the present approaches automatically check the consistency of parameters and validate the health of torque sensors of an aircraft engine and these steps are made in compliance with various standards (e.g., cybersecurity or other security guidelines). Invalid parameters associated with the sensor are discarded if not consistent with the associated engine and human errors and intentional acts of sabotage are prevented. These approaches are inexpensive to implement and provide accurate determination of torque sensor health.

It should be understood that the controllers (e.g., the controller 110) provided herein may implement the various functionality described herein. In terms of hardware architecture, such a controller can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in a memory. The processor can be a custom made or commercially available processor, a central processing unit (CPU), an auxiliary processor among several processors associated with the computing device, a semiconductor-based microprocessor (in the form of a microchip or chip set) or generally any device for executing software instructions.

The memory devices described herein (e.g., memory 116) can include any one or combination of volatile memory elements (e.g., random access memory (RAM), such as dynamic RAM (DRAM), static RAM (SRAM), synchronous dynamic RAM (SDRAM), video RAM (VRAM), and so forth) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The controllers may implement the functions described herein in any combination of hardware and software (e.g., with the software being executed by a controller). The software may be stored in any memory device and may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a controller such as a microprocessor. However, as mentioned, these approaches can be implemented as any combination of electronic hardware and/or software.

Further aspects of the invention are provided by the subject matter of the following clauses:

A method for calibrating a torque sensor of an aircraft engine, the method comprising: receiving operator input including an engine identifier from an engine and torque sensor parameters associated with a torque sensor of the engine; determining a conformance of the engine identifier and torque sensor parameters to an expected engine identifier and expected torque sensor parameters for the engine; when conformance is determined: activating the engine; measuring a raw torque from the torque sensor at the engine; calibrating the raw torque using the torque sensor parameters to produce a calibrated torque value; measuring non-torque parameters associated with the engine and applying the non-torque parameters to a lookup structure to obtain an expected torque value; determining a separation of the calibrated torque value and the expected torque value; based upon the separation, controlling an operation of the torque sensor.

The method of any preceding clause, wherein the engine identifier comprises a serial number.

The method of any preceding clause, wherein the torque sensor parameters comprise a gain factor and an offset.

The method of any preceding clause, wherein the conformance is determined examines to see if the parameters are within predetermined ranges.

The method of any preceding clause, wherein the calibrating of the raw torque is performed by applying the torque sensor parameters to the raw torque.

The method of any preceding clause, wherein the lookup structure is a lookup table.

The method of any preceding clause, wherein the operator input is displayed on a plate attached to the engine.

The method of any preceding clause, wherein controlling an operation of the torque sensor comprises deactivating the torque sensor.

The method of any preceding clause, wherein the separation is determined by comparing the difference between the calibrated torque value and the expected torque value to a threshold.

The method of any preceding clause, wherein the non-torque parameters comprise speed or pressure.

A system, comprising: an engine; a torque sensor coupled to the engine; at least one non-torque sensor; a controller, the controller being coupled to the torque sensor and the at least one non-torque sensor, the controller being configured to, when the engine is deactivated: receive operator input including an engine identifier associated with the engine and torque sensor parameters associated with a torque sensor of the engine; determine a conformance of the engine identifier and torque sensor parameters to an expected engine identifier and expected torque sensor parameters for the engine; when conformance is determined and upon activation of the engine, the controller is further configured to: measure a raw torque from the torque sensor at the engine; calibrate the raw torque using the torque sensor parameters to produce a calibrated torque value; measure non-torque parameters associated with the engine and applying the non-torque parameters to a lookup structure to obtain an expected torque value; determine a separation of the calibrated torque value and the expected torque value; based upon the separation, control an operation of the torque sensor.

The system of any preceding clause, wherein the engine identifier comprises a serial number.

The system of any preceding clause, wherein the torque sensor parameters comprise a gain factor and an offset.

The system of any preceding clause, wherein the conformance is determined examines to see if the parameters are within predetermined ranges.

The system of any preceding clause, wherein the raw torque is calibrated by applying the torque sensor parameters to the raw torque.

The system of any preceding clause, wherein the lookup structure is a lookup table.

The system of any preceding clause, wherein the operator input is displayed on a plate attached to the engine.

The system of any preceding clause, wherein the operation of the torque sensor is controlled by deactivating the torque sensor.

The system of any preceding clause, wherein the separation is determined by comparing the difference between the calibrated torque value and the expected torque value to a threshold.

The system of any preceding clause, wherein the non-torque parameters comprise speed or pressure.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A method for calibrating a torque sensor of an aircraft engine, the method comprising:
    receiving input including an engine identifier from an engine and torque sensor parameters associated with a torque sensor of the engine;
    determining a conformance of the engine identifier and torque sensor parameters to an expected engine identifier and expected torque sensor parameters for the engine;
    when conformance is determined:
        activating the engine:
        measuring a raw torque from the torque sensor at the engine;
        calibrating the raw torque using the torque sensor parameters to produce a calibrated torque value;
        measuring non-torque parameters associated with the engine and applying the non-torque parameters to a lookup structure to obtain an expected torque value;
        determining a separation of the calibrated torque value and the expected torque value; and
        based upon the separation, controlling an operation of the torque sensor;
    wherein controlling an operation of the torque sensor comprises deactivating the torque sensor.

2. The method of claim 1, wherein the engine identifier comprises a serial number.

3. The method of claim 1, wherein the torque sensor parameters comprise a gain factor and an offset.

4. The method of claim 1, wherein the conformance is determined by examining whether the torque sensor parameters are within predetermined ranges.

5. The method of claim 1, wherein the calibrating of the raw torque is performed by applying the torque sensor parameters to the raw torque.

6. The method of claim 1, wherein the lookup structure is a lookup table.

7. The method of claim 1, wherein the input is displayed on a plate attached to the engine.

8. The method of claim 1, wherein the separation is determined by comparing a difference between the calibrated torque value and the expected torque value to a threshold.

9. The method of claim 1, wherein the non-torque parameters comprise speed or pressure.

10. A system for torque sensor calibration, the system comprising:
    an engine;
    a torque sensor coupled to the engine;
    at least one non-torque sensor; and
    a controller, the controller being coupled to the torque sensor and the at least one non-torque sensor, the controller being configured to, when the engine is deactivated:
        receive input including an engine identifier associated with the engine and torque sensor parameters associated with the torque sensor of the engine;
        determine a conformance of the engine identifier and torque sensor parameters to an expected engine identifier and expected torque sensor parameters for the engine;
    when conformance is determined and upon activation of the engine, the controller is further configured to:
        measure a raw torque from a torque sensor at the engine;
        calibrate the raw torque using the torque sensor parameters to produce a calibrated torque value;
        measure non-torque parameters associated with the engine and applying the non-torque parameters to a lookup structure to obtain an expected torque value;
        determine a separation of the calibrated torque value and the expected torque value; and
        based upon the separation, control an operation of the torque sensor;
    wherein the operation of the torque sensor is controlled by deactivating the torque sensor.

11. The system of claim 10, wherein the engine identifier comprises a serial number.

12. The system of claim 10, wherein the torque sensor parameters comprise a gain factor and an offset.

13. The system of claim 10, wherein the conformance is determined by examining whether the torque sensor parameters are within predetermined ranges.

14. The system of claim 10, wherein the raw torque is calibrated by applying the torque sensor parameters to the raw torque.

15. The system of claim 10, wherein the lookup structure is a lookup table.

16. The system of claim 10, wherein the input is displayed on a plate attached to the engine.

17. The system of claim 10, wherein the separation is determined by comparing a difference between the calibrated torque value and the expected torque value to a threshold.

18. The system of claim 10, wherein the non-torque parameters comprise speed or pressure.

* * * * *